United States Patent [19]

Martin

[11] Patent Number: 5,076,174
[45] Date of Patent: Dec. 31, 1991

[54] FLEXIBLE COVER FOR MULTIPLE COMPARTMENT VEHICLE HAVING A RIGID MOVABLE FRAME AND LIFT ASSISTING RESILIENT STRAPS

[75] Inventor: Jeffrey R. Martin, Schewsbury, Mass.

[73] Assignee: Cramaro Tarpaulin Systems, Schrewsbury, Mass.

[21] Appl. No.: 522,803

[22] Filed: May 14, 1990

[51] Int. Cl.⁵ .............................................. B61D 39/00
[52] U.S. Cl. ...................................... 105/377; 296/100; 296/101
[58] Field of Search ................ 105/377; 296/100, 101; 292/288; 16/DIG. 2

[56] References Cited

U.S. PATENT DOCUMENTS

| | | | |
|---|---|---|---|
| 1,428,448 | 9/1922 | Peck | 105/377 |
| 1,810,510 | 6/1931 | Winne | 16/DIG. 2 X |
| 1,861,277 | 5/1932 | Kjolseth | 296/100 |
| 2,015,767 | 10/1935 | Suckfield | 105/377 |
| 2,465,621 | 3/1949 | Wheeler | 296/100 X |
| 2,636,209 | 4/1953 | Tedder | 16/DIG. 2 X |
| 2,899,912 | 8/1959 | Janeoko | 296/100 X |
| 2,909,387 | 10/1959 | Burtzloff | 296/100 X |
| 2,919,946 | 1/1960 | Miener | 292/288 |
| 2,989,340 | 6/1961 | Penner | 296/100 |
| 3,174,787 | 3/1965 | Kolman | 292/288 |
| 3,514,152 | 5/1970 | Hermon | 296/100 |
| 4,050,734 | 9/1977 | Richard | 296/100 X |
| 4,168,096 | 9/1979 | Langston | 296/100 |
| 4,200,330 | 4/1980 | Scott | 296/100 |
| 4,210,358 | 7/1980 | Sweet | 296/100 |
| 4,261,611 | 4/1981 | Barry | 296/100 |
| 4,265,479 | 5/1981 | Langston | 296/100 |
| 4,268,084 | 5/1981 | Peters | 296/100 X |
| 4,691,957 | 9/1987 | Ellingson | 296/100 X |
| 4,832,394 | 5/1989 | Macomber | 296/100 |

FOREIGN PATENT DOCUMENTS 327583  5/1930  United Kingdom .

Primary Examiner—Robert J. Oberleitner
Assistant Examiner—S. Joseph Morano
Attorney, Agent, or Firm—Connolly & Hutz

[57] ABSTRACT

A vehicle cover system includes a cover member which covers the open top of the vehicle body. The cover member is mounted on a frame extending longitudinally down each side of the body. The central portion of the cover member is mounted to the body. Each frame is pivoted to the body along a hinge axis which is offset from and parallel to the center line of the cover member so that there is selective access to the interior of the body along each side when the cover is pivoted to its open position. The body is closed when the cover is pivoted to its closed position. The cover and its frame are moved to and from the open position by a handle. Resilient members are provided which react against the frame to urge the frame to the open position once the handle is actuated.

28 Claims, 3 Drawing Sheets

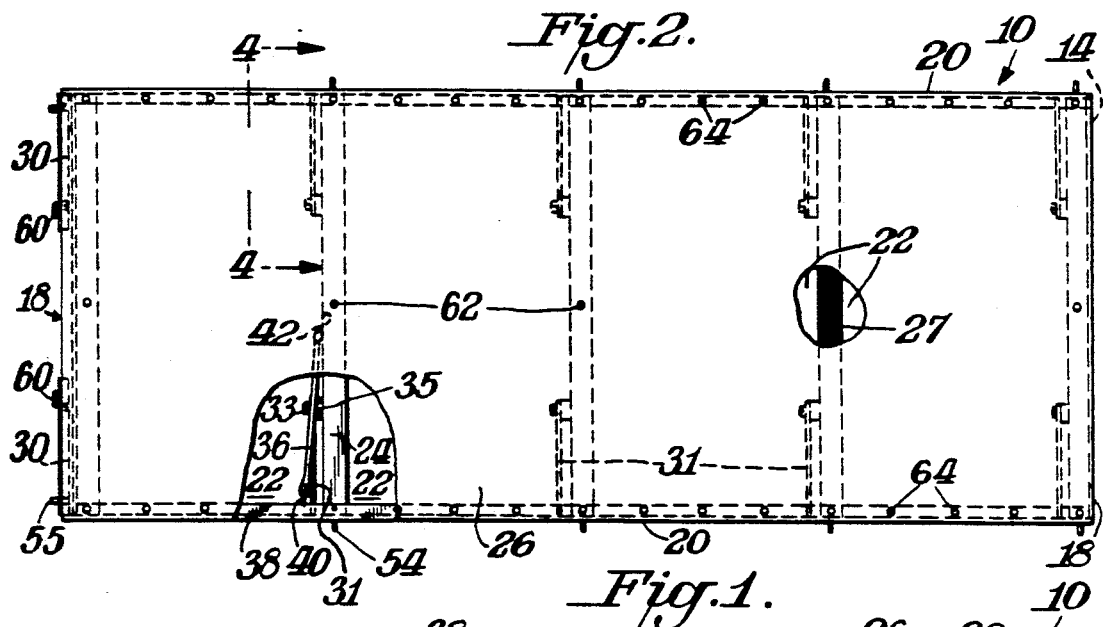
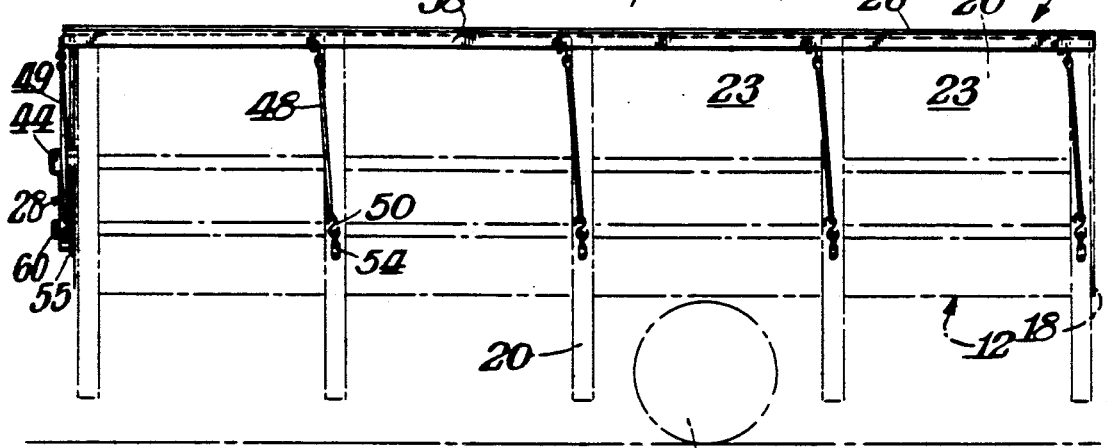
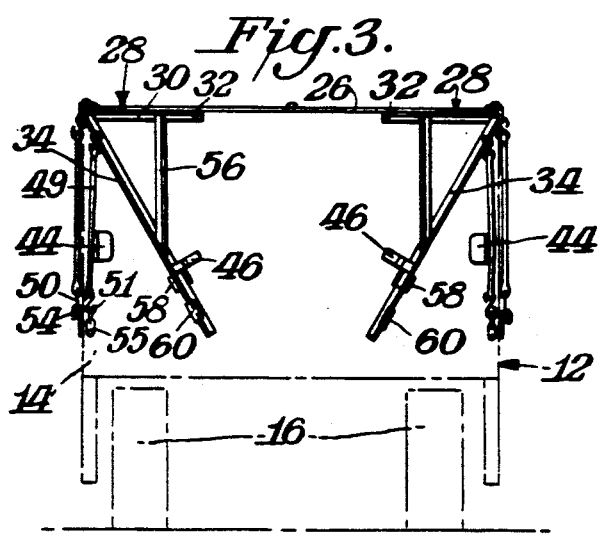

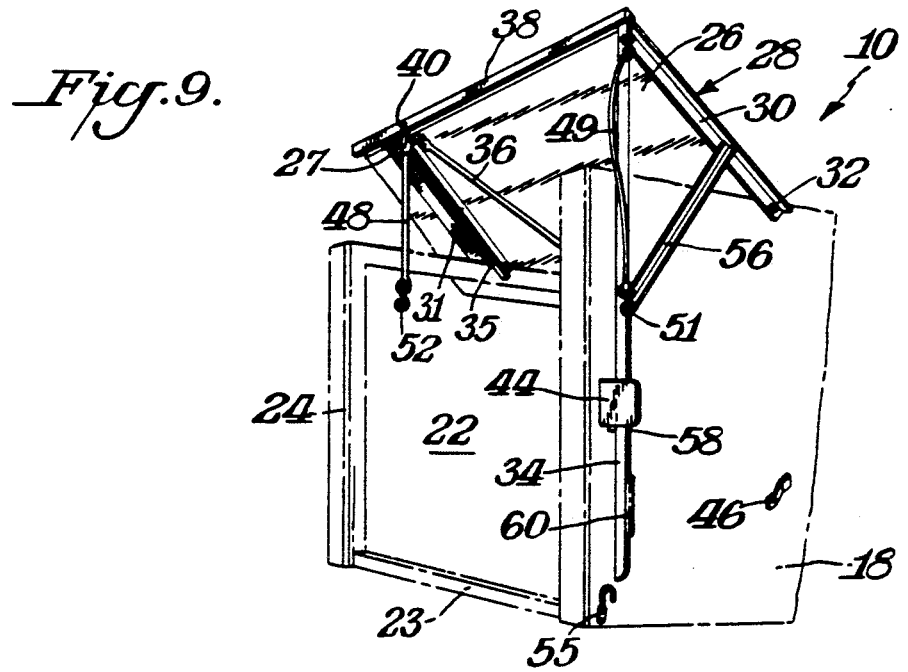
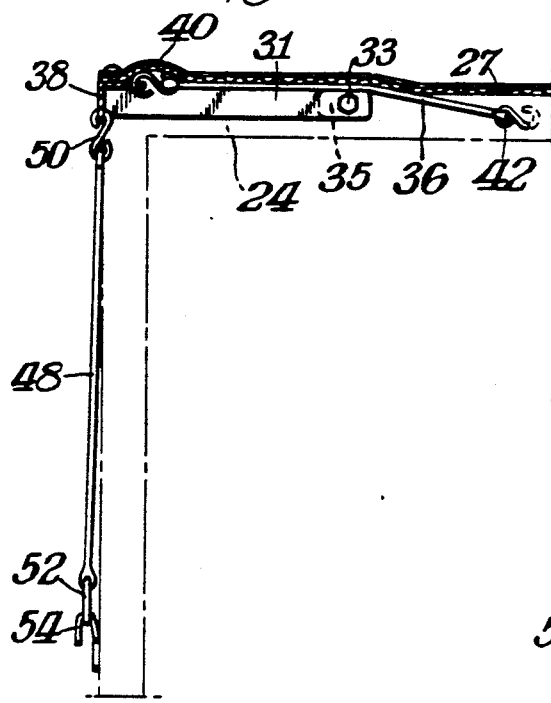
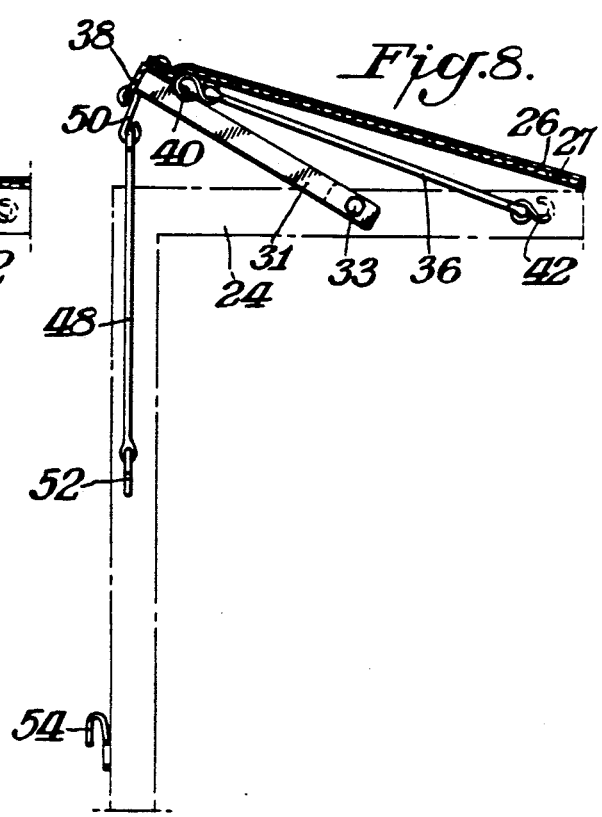

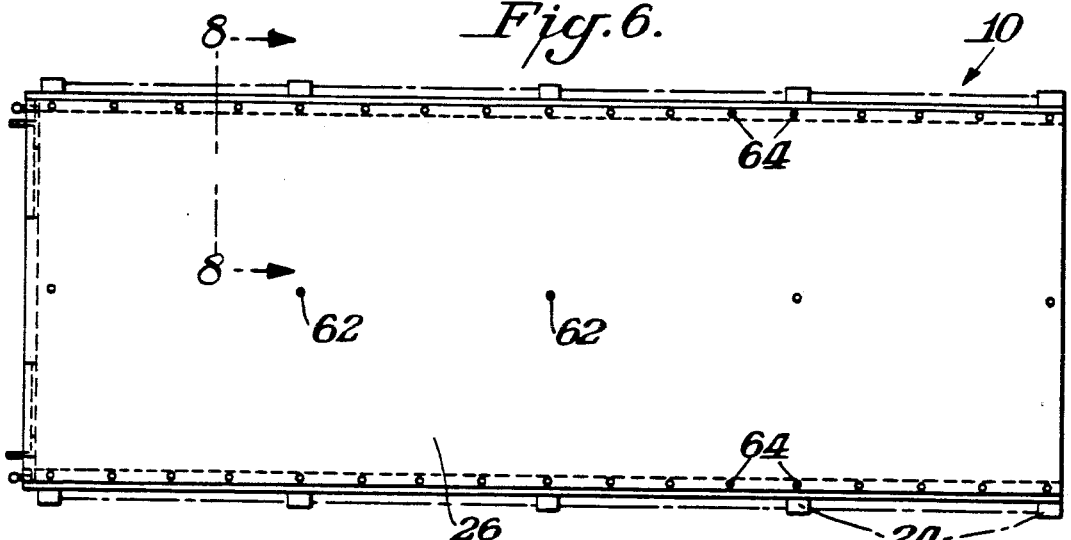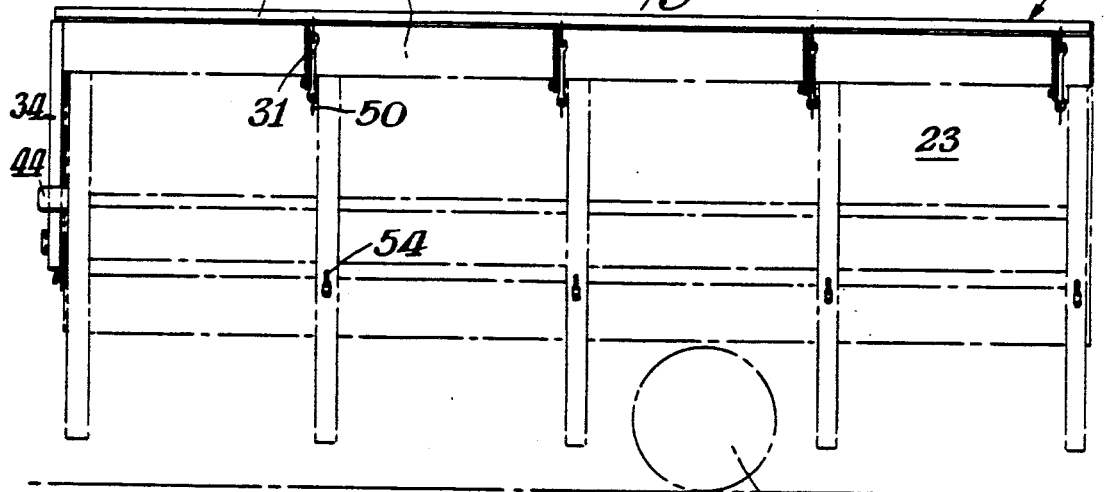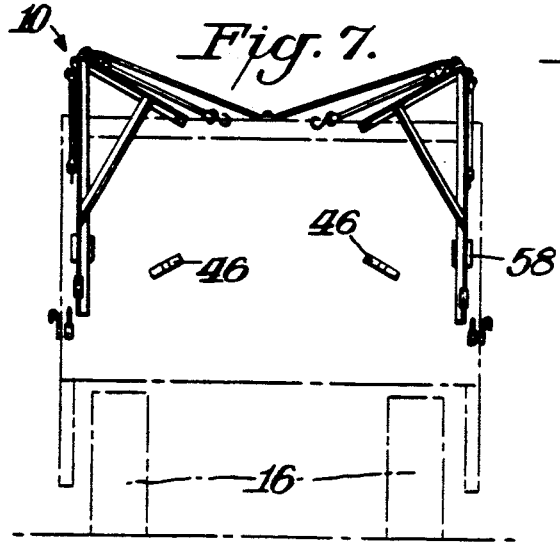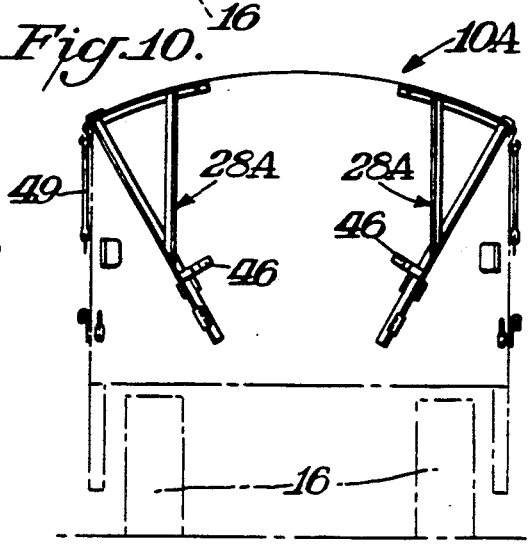

5,076,174

FLEXIBLE COVER FOR MULTIPLE COMPARTMENT VEHICLE HAVING A RIGID MOVABLE FRAME AND LIFT ASSISTING RESILIENT STRAPS

BACKGROUND OF THE INVENTION

Various types of vehicle bodies are known in the art. One prominent type has an open top which permits top loading. Such vehicle bodies include not only truck bodies but also, for example, railroad cars. Another type of vehicle body, which is gaining prominence is the re-cycling body used for hauling refuse. In particular, such re-cycling vehicles are compartmentalized so that different types of refuse could be loaded into the individual compartments. For example, bottles and other types of glass might be loaded into one compartment, paper might be loaded into another compartment, metal cans might be loaded into a further compartment, etc. Generally such re-cycling vehicles provide each compartment with its own door. Such doors are generally formed to slide up and down so as to vary the amount of access to a compartment. For example, when a compartment is almost empty the door would be slid to its open most position, thereby maximizing access to the compartment. As the compartment is filled the door would be open to a lesser degree. When the compartment is almost completely full the access is quite restricted.

It would be desirable if a covering system could be provided for the above type vehicles wherein access could be had in a simple and convenient manner through the top of the vehicle body. It would also be desirable if a cover system could be provided wherein the access through the top of the body is limited to the areas where the vehicle body would be loaded.

It is known to provide vehicles with body cover systems wherein the cover member is in the form of a flexible tarpaulin (tarp) which would extend completely across and cover the entire open top of the vehicle. In one form of cover system (U.S. Pat. No. 4,189,179) which has met with great success the tarp is moved between its open and closed positions by being mounted to and thus guided and moved by a cable system secured around pulleys at the top of the vehicle body. The movement of the tarp is effected by a crank or handle on the side of the vehicle. In this arrangement the vehicle is exposed through its top beginning at the rear end of the vehicle body until a tarp has moved completely toward the front end to completely expose the vehicle. Such system would not be particularly suitable for compartmentalized re-cyling vehicles since the entire top would have to be exposed for access to a front end compartment.

SUMMARY OF THE INVENTION

An object of this invention is to provide a vehicle cover system which meets the above indicated needs and solves the above indicated problems.

A further object of this invention is to provide such a cover system wherein there is ready access to the interior of the vehicle through the top in an area generally located where the loading will take place rather than having to completely uncover the entire vehicle body.

A further object of this invention is to provide such a cover system which is particularly adaptable for use in vehicles having re-cycling bodies.

In accordance with this invention the vehicle cover system includes a cover member, which is preferably a flexible tarp mounted to at least one frame extending longitudinally down a portion of the vehicle body and pivoted to the body along a hinge axis offset from and parallel to the center line of the cover member. A handle is provided to pivot the frame between its open and closed positions. In addition, resilient means react between the frame and the body to assist in the movement of the frame to its open position.

In a preferred practice of this invention one of such frames is provided on each side of the vehicle body so that loading can take place on either side. The resilient means is preferably a resilient strap, such as made from rubber, mounted under the cover member with one end secured to the free end of the frame and the other end secured to the vehicle body beyond the pivot means. A stop member is preferably provided on the vehicle body to limit the opening movement of the handle. Flexible straps may also be connected to the frame and detachably connected to the body to assist in maintaining the cover in its closed position.

THE DRAWINGS

FIG. 1 is a side elevation view of a vehicle cover system in accordance with this invention with the vehicle shown in phantom;

FIG. 2 is a top plan view partly broken away of the cover system shown in FIG. 1;

FIG. 3 is a front elevation view of the cover system shown in FIGS. 1-2 in its closed position;

FIG. 4 is a cross-sectional view taken through FIG. 2 along the line 4—4;

FIG. 5 is a side elevation view similar to FIG. 1 with the cover system in its open position;

FIG. 6 is a top plan view of the cover system shown in FIG. 5;

FIG. 7 is a front elevation view similar to FIG. 3 of the cover system in its open position;

FIG. 8 is a cross-sectional view taken through FIG. 6 along the lines 8—8;

FIG. 9 is a perspective view of a portion of the cover system shown in FIGS. 1-8 in its open position; and FIG. 10 is a front elevation view similar to FIG. 3 of a modified form of cover system.

DETAILED DESCRIPTION

As illustrated in the drawings a cover system 10 is provided for covering the open top of a vehicle 12. The drawings illustrate vehicle 12 as a vehicle having a compartmentalized re-cycling body. It is to be understood, however, that this invention is not limited to use with such vehicle, but may be used with any type of vehicle having an open top wherein access through the top is desired to facilitate top loading. Accordingly, such vehicles may be formed of individual compartments having different sizes or of a body containing only one compartment. Additionally, such vehicles may also be, for example, railroad cars as well as any other types of bodies wherein top loading is desired.

As illustrated, vehicle 12 includes a body 14 mounted on wheels 16. Body 14 has a pair of end walls 18 and a pair of side walls 20. In the illustrated embodiment, body 14 is divided into four individual compartments 22 which includes bulkheads 24 between each compartment. Access is had to the individual compartments by means of sliding doors 23 formed in side walls 20 with a door being provided for each compartment. The degree to which access is had through the side walls of body 14 would vary in accordance with the amount in which each compartment 22 is filled. For example, when an individual compartment 22 is substantially empty, the slide door 23 would be slid to its lower most position thereby maximizing the access to the interior of that compartment. During use, as the compartment gets more and more filled, the degree of opening of slide door 23 would lessen until the access through slide door 23 is minimized when the compartment is substantially filled.

The cover system 10 of this invention has particular utility to maximize the ability to load objects into the individual compartments by providing top loading access as well as side loading access. Such top loading is extremely useful when a compartment is substantially filled. As previously indicated, however, the invention is not limited to vehicles having access through the sides. Rather the invention may be practiced with vehicles where access through the top of cover system 10 is the sole means for loading the vehicle body.

Cover system 10 includes a cover member 26, which in the preferred practice of the invention is a flexible tarpaulin (tarp). System 10 also includes a pair of frames 28 extending longitudinally down each side of the vehicle body. In the illustrated embodiment each frame 28 is comprised of a longitudinal support member 38 having a number of arms corresponding to the number of bulkheads. The outermost arm 30 is pivotally connected by any suitable pivot member 32 on wall 18, while arms 31 are connected by pivots 33 to bulkheads 24 to form a hinge axis offset from and parallel to the longitudinal center line of cover 26. Cover member 26 may thus be considered divided into three sections. These sections include two hinged sections (one extending longitudinally down each side of the vehicle body 14) and a central stationary section resting on and secured to bulkheads 24. The pivoted or hinged sections of cover member 26 are mounted to frames 28. Cover member 26 includes reinforcing webs 27 where the cover member overlies the bulkheads. See FIG. 2.

Each frame 28 and its associated portion of cover member 26 has two positions. In one position, the frame 28 is pivoted a maximum amount away from the open top of body 14 to comprise the open position of the frame and its portion of the cover member 26. In the other position, frame 28 is pivoted the maximum distance toward the open body whereby its cover member 26 completely covers its portion of the open body. This is closed position of the frame. The frames 28 are lifted by the operator pulling on pull handles or levers 34 located at the end wall 18 of body 14, preferably at the front end wall near the vehicle cab. Handle or lever 34 is rigidly attached at one end to the arm 30 disposed at the end wall 18. The free end of handle 34 is conveniently located where it may be easily held by the operator to raise or lower the corresponding frame 28.

In order to facilitate the opening action of frame 28 resilient means preferably in the form of rubber straps 36 are mounted to each arm 31 below cover member 26. As best illustrated in FIG. 8 straps 36 are secured in any suitable manner, such as by S hooks 40 at one end of strap 36 to a corresponding arm 31. The other end of strap 36 is secured by S hook 42 to the bulkhead 24 at a location beyond pivot members 32. As shown in FIG. 4, in its closed position each strap 36 is disposed over a tensioning block 35. Once the initial motion has been set by rotating handle 34, the potential loading of rubber straps 36 take over and the resilient force imparted from the rubber straps raise the frame to its fullest extent. The fullest extent is dictated by a stop system in the path of motion of handle 34. The stop system may take any suitable form, such as a metal plate 44 welded to end wall 18. Thus, as handle 34 is swung to the open position of frame 28, the movement of handle 34 is stopped when handle 34 contacts stop plate 44 which in turn holds frame 28 and its corresponding portion of the cover member in its open position.

A further feature of this invention is the provision of lock means to hold handle 34 and frame 28 in their closed position. The lock means may also take any suitable form. In the illustrated embodiment, handle 34 and its frame 28 are held in the locked position by means of rubber straps 48 secured by S hooks 50 to a respective arm 31 and detachably secured by a S hook 52 to a hook member 54 mounted to bulkhead 24. The endmost arm 30 is provided with strap 49 having hook 51 detachably secured to hook 55 on end wall 18 (FIG. 9). FIG. 4 illustrates strap 48 secured in the locked position, while FIGS. 8 and 9 show strap 48 and strap 49 in the free or unlocked position.

In order to minimize vibration of handle 34 in the closed position while the vehicle is moving, a modified Z-bar 46 is mounted on wall 18. Handle 34 is disposed between the free leg of Z-bar 46 and the end wall 18 diving this condition.

As best shown in FIG. 9 a cross bar 56 interconnects arm 28 and handle 34 to provide a more rigid connection between the arm and handle. Additionally, a slide block 58 preferably made of polyurethane is mounted to handle 34 in any suitable manner, to reduce the friction between handle 34 and end wall 18 in the sliding movement which results when handle 34 is repeatedly moved to and from its open and closed positions. Handle 34 also includes an extension 60 to facilitate grasping the handle.

Although FIGS. 1-9 show cover member 26 to be flat, the invention is not limited to such shape. FIG. 10, for example, illustrates system 10A to have curved frames 28A whereby the cover member would have an arched shape.

The components of system 10 may be made in any suitable size and of any suitable materials. For example, frame 28 would be made of a length corresponding to the length of body 14 while its arms 30,31 might be two inches long and attached to the top of each compartment bulkhead by ¼ inch bolts. The frame may be made of 6061 grade, 1.5×1.5 inch aluminum 0.25 inch angle welded together. Handle 34 may be made of the same aluminum angle welded together. Cover member 26 is preferably 18 ounce vinyl heat sealed together and reinforced at the bulkhead contact points with two inch seatbelt webbing 27. The rubber straps 36 may be 31 inches long, while the lock down straps 48,49 may be 21 inches long. Each such strap 36 would be used for each arm of the frame except at the front bulkhead. The vinyl cover 26 may be secured by fasteners 64 made of sheet metal screws secured to the support member 38 down the sides of the frame 28 with screws 62 used along the longitudinal center line of the cover at each bulkhead.

As can be appreciated, cover system 10 thus provides a simple and effective way of selectively opening and closing portions of a vehicle body along the longitudinal edges of the vehicle body to expose a sufficient amount of the interior of the vehicle, whereby the vehicle may be readily loaded. The invention, however, may be practiced with a cover member having a size which does not completely conform in size to the vehicle body. What is necessary is that a portion of the body along its longitudinal edge should be selectively opened and closed by actuation of the cover system.

What is claimed is:

1. A vehicle cover system for selectively covering and uncovering an open top vehicle body comprising a cover member having a longitudinal centerline, a frame for extending longitudinally down a portion of the top of the vehicle body at the longitudinal edge of the vehicle body, said frame comprising a support member having a plurality of arms extending outwardly from said support member whereby said frame may be disposed over a longitudinally first portion of the open top of the vehicle body, a first section of said cover member being mounted to said frame for joint movement therewith, a second section of said cover member extending beyond said frame for being disposed over a longitudinally second portion of the open top of the body contiguous to the first portion, pivot means for securing said frame to the vehicle body whereby the first portion of the body may be exposed through its open top when said frame and said first section of said cover member are pivoted along a hinge axis to an open position to provide access to the interior of the body and permit the body to be top loaded and the first portion of the vehicle body may be closed when said frame and said first section of said cover member are pivoted to a closed position, means for selectively moving said frame and said first section of said cover member to said open position and to said closed position, said moving means comprising a handle in the form of a lever rigidly secured directly to said frame whereby a movement of said lever from a first position permits said frame and said first section of said cover member to be lifted to said open position and a reverse movement of said lever from a second position causes said frame and said first section of said cover member to be lowered to said closed position while the vehicle remains upright in both said open and closed position, said frame in said open position being elevated to an angle above said closed position and spaced from said second section of said cover member, means for urging said frame to said open position when said lever is moved from its said first position, and means for holding said frame in said elevated open position.

2. The system of claim 1 wherein said means for urging said frame comprises resilient means reacting against said frame to urge said frame to said open position which is at an angle of less than 90° away from said closed position.

3. The system of claim 2 wherein one of said frames is provided longitudinally on each side of said cover member.

4. The system of claim 3 including a slide block mounted to said lever.

5. The system of claim 2 wherein said means for holding said frame in said elevated open position includes a stop plate fixedly mounted in the path of motion of said lever.

6. The system of claim 2 including resilient lock straps mounted at one end to said frame, and the other end of said resilient lock straps having fastening means for detachable securement to the vehicle body for selectively holding said frame in said closed position.

7. The system of claim 2 wherein said resilient means comprises resilient frame opening straps secured at one end to said frame, said frame opening straps extending beyond said hinge axis, and the other end of said frame opening straps being adapted to be secured to the vehicle body.

8. The system of claim 7 wherein said frame opening straps are located below said cover member.

9. The cover system of claim 7 including handle retainer means for holding said lever to minimize vibration of said lever when said frame is in said closed position.

10. The cover system of claim 9 wherein said handle retainer means comprises a Z-bar for being mounted to the body.

11. The system of claim 1 wherein said cover member is a flat flexible tarpaulin.

12. The system of claim 1 wherein said cover member is an arched flexible tarpaulin.

13. The system of claim 1 including resilient lock straps mounted at one end to said frame, and the other end of said resilient lock straps having fastening means for detachable securement to the vehicle body for selectively holding said frame in said closed position.

14. The system of claim 1 in combination with an open top vehicle, and said vehicle being a railroad car.

15. In a re-cycling vehicle having a body separated into a plurality of individual vertical compartments, a vertically slidable door at the side of each of said compartments selectively opening and closing its respective said compartment in accordance with the vertical position of its said door, each of said compartments being open in a direction from the top edge of said compartment downwardly as its said door is slid downwardly, and a plurality of longitudinally spaced bulkheads separating said compartments from each other, the improvement being in a movable frame extending longitudinally across a first portion of the top of said vehicle, said frame comprising a support member having a plurality of arms extending outwardly therefrom, a cover member, said cover member having a first section mounted to said frame for joint movement therewith, a second section of said cover member extending beyond said frame and mounted to said bulkheads to cover a second portion of said top of said vehicle contiguous to said first portion, said frame being pivotally connected to said body by pivot means disposed along a longitudinal hinge line disposed inwardly of said slidable doors at said top edge of said compartments, said frame and said first section of said cover member being movable to an open position with said frame and said first section of said cover member elevated above said top edge of said compartments to provide access to the interior of said compartments through a continuous opening formed at the side of said vehicle and the sides of said compartments where said doors are slid downwardly, said frame and said first section of said cover member having a closed position when said frame and said first section of said cover member are lowered to said top edge of said compartments, and means for selectively moving said frame and said first section of said cover member to said open position and to said closed position while said vehicle body remains upright in both said open and closed positions, wherein said moving means comprises a handle in the form of a lever rigidly secured directly to said frame whereby a movement of said lever permits said frame to be moved to said open position and a reverse movement of said lever causes said frame to be lowered to said closed position.

16. The vehicle of claim 15 including means for urging said frame to said open position with said frame and said first section of said cover member elevated to an angle above said closed position and spaced from said second section of said cover member, and means for holding said frame in said elevated open position.

17. The vehicle of claim 16 wherein said means for urging said frame comprises resilient means reacting against said frame to urge said frame to said open position at an angle less than 90° from said closed position.

18. The vehicle of claim 17 wherein said resilient means comprises resilient frame opening straps secured at one end to said frame, said frame opening straps extending beyond said hinge line, and the other end of said frame opening straps being secured to said vehicle body.

19. The vehicle of claim 18 wherein said frame opening straps are located below said cover member.

20. The vehicle of claim 19 wherein one of said frames is provided longitudinally on each side at the top of said vehicle body offset from the longitudinal centerline of said vehicle top.

21. The vehicle of claim 16 wherein said means for holding said frame in said elevated open position includes a stop plate fixedly mounted in the path of motion of said lever.

22. The vehicle of claim 16 including resilient lock straps mounted at one end to said frame, and the other end of said resilient lock straps having fastening means for detachable securement to said vehicle body for selectively holding said frame in said closed position.

23. The vehicle of claim 15 wherein each of said plurality of arms is secured to a respective one of said bulkheads, and said pivot means being mounted to said arms.

24. The vehicle of claim 15 wherein said cover member is a flat flexible tarpaulin.

25. The vehicle of claim 15 wherein said cover member is an arched flexible tarpaulin.

26. The vehicle of claim 15 wherein one of said frames is provided longitudinally on each side at the top of said vehicle body offset from the longitudinal centerline of said vehicle top.

27. The vehicle of claim 15 including resilient lock straps mounted at one end to said frame, and the other end of said resilient lock straps having fastening means detachably secured to said vehicle body for selectively holding said frame in said closed position.

28. The vehicle of claim 15 including resilient frame opening straps secured at one end to said frame, said frame opening straps extending beyond said hinge line, and the other end of said frame opening straps being secured to said vehicle body.

* * * * *